(12) United States Patent
Hanna

(10) Patent No.: US 6,454,446 B1
(45) Date of Patent: Sep. 24, 2002

(54) HEADLAMP COVER SYSTEM

(76) Inventor: Daniel John Hanna, 47 Davenport Dr., Rye, Victoria 3941 (AU)

( * ) Notice: Subject to any disclaimer, the term of this patent is extended or adjusted under 35 U.S.C. 154(b) by 0 days.

(21) Appl. No.: 09/555,883

(22) PCT Filed: Dec. 3, 1998

(86) PCT No.: PCT/AU98/01002

§ 371 (c)(1),
(2), (4) Date: Jun. 5, 2000

(87) PCT Pub. No.: WO99/28150

PCT Pub. Date: Jun. 10, 1999

(30) Foreign Application Priority Data

Dec. 3, 1997 (AU) .............................................. PP0724

(51) Int. Cl.[7] .............................................. F21V 33/00
(52) U.S. Cl. ........................ 362/475; 362/512; 362/269; 362/322
(58) Field of Search ................................... 362/475, 509, 362/512, 513, 538, 539, 280, 321, 351, 375, 526, 473, 282, 322

(56) References Cited

U.S. PATENT DOCUMENTS

| | | | | |
|---|---|---|---|---|
| 2,312,005 A | * | 2/1943 | Smith .......................... | 362/527 |
| 2,388,788 A | * | 11/1945 | Kushel et al. ................ | 362/512 |
| 2,524,442 A | * | 10/1950 | Healey ......................... | 362/513 |
| 2,700,725 A | * | 1/1955 | Morphew et al. ............ | 362/512 |
| 4,441,144 A | | 4/1984 | Horiuchi et al. | |
| 4,443,836 A | | 4/1984 | Horiuchi et al. | |
| 4,737,893 A | * | 4/1988 | Horansky et al. ............ | 362/512 |
| 4,760,499 A | * | 7/1988 | Il ................................. | 362/512 |
| 4,947,295 A | | 8/1990 | Carrell | |

FOREIGN PATENT DOCUMENTS

GB 2126329 * 3/1984 ................. 362/512

* cited by examiner

Primary Examiner—Sandra O'Shea
Assistant Examiner—Peggy Neils
(74) Attorney, Agent, or Firm—Knobbe, Martens, Olson & Bear, LLP

(57) ABSTRACT

A motorcycle headlamp assembly has a headlamp for emitting a beam and a cover with a spherical shell that encloses the headlamp. The shell has an aperture through which the beam is emitted when the headlamp is operative. A shutter closes the aperture when the headlamp is inoperative. The shutter lies closely adjacent the inner surface of the shell so that an outer surface of the shutter closely conforms to the inner surface of the shell. The shutter is mounted for pivotal movement about an axis coincident with a center of the shell such that the shutter pivots about the axis between closed and open positions. In its open position, the closely conforms to the inner surface of the shell.

7 Claims, 2 Drawing Sheets

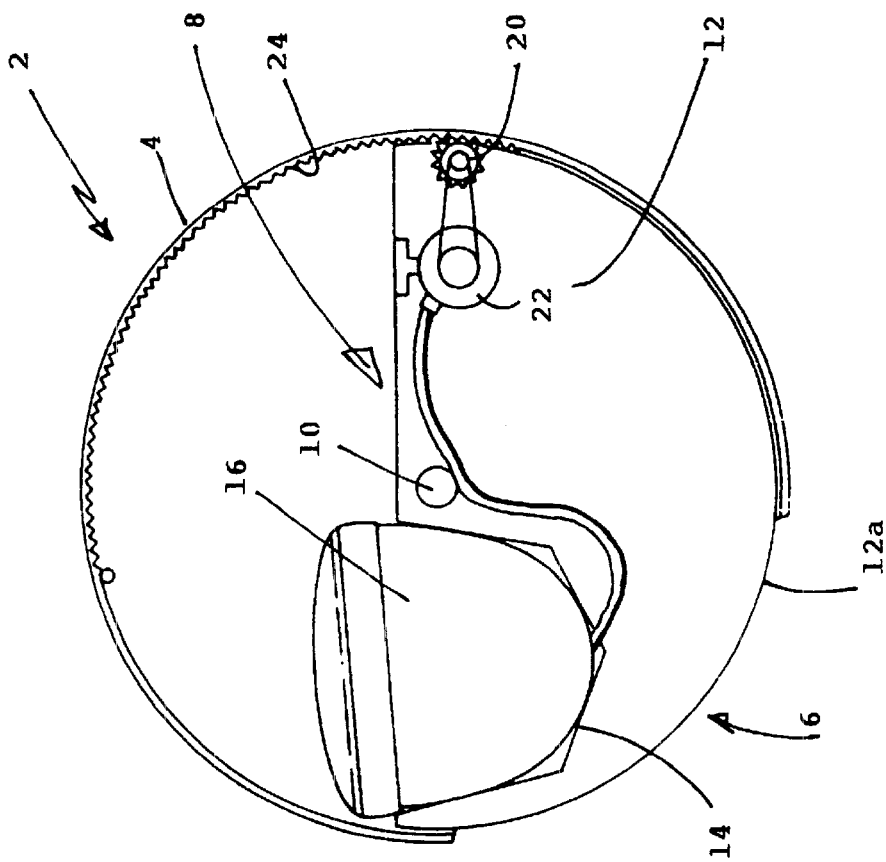
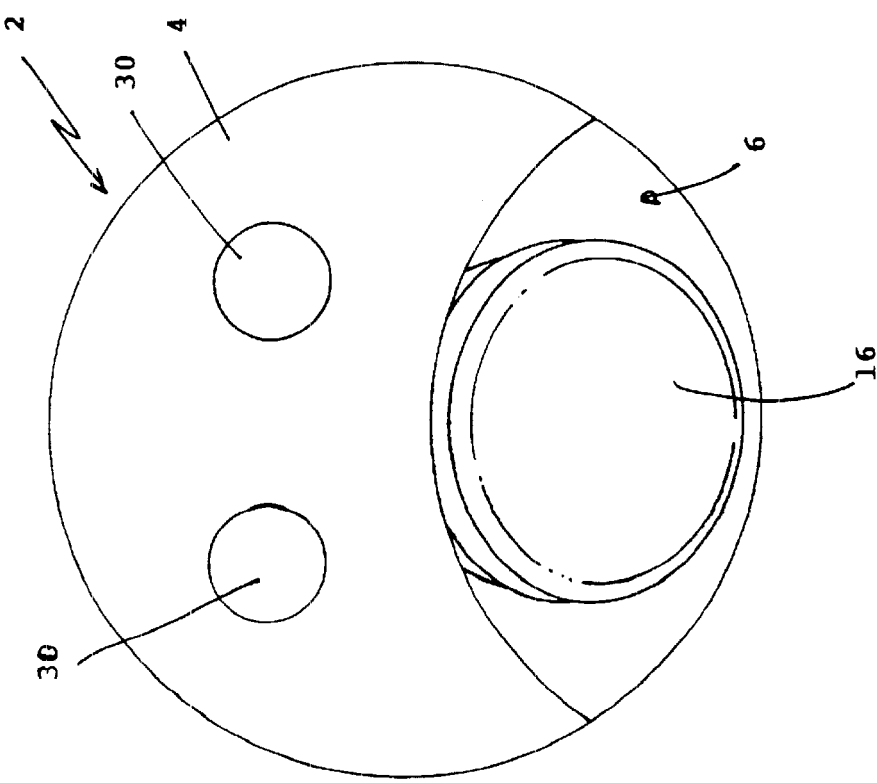

HEADLAMP COVER SYSTEM

BACKGROUND

The present invention relates to a headlamp cover system, particularly for a motor cycle headlamp.

SUMMARY

According to the present invention, there is provided a cover system for a headlamp of a vehicle, said cover system including an outer shell which encloses a headlamp, said shell having a forwardly-facing aperture through which the headlamp beam can project, and means for rendering the aperture closed against passage of the beam.

In preferred embodiments of the invention the shell is of generally spherical form resembling a head with the aperture being in a position corresponding to a mouth of the head whereby the mouth selectively opens and closes in operative and inoperative conditions, respectively, of the headlamp.

In one preferred embodiment the headlamp is carried by a support mounted within the shell for movement between the operative and inoperative conditions, in the inoperative condition the aperture being closed by part of the support.

In an alternative embodiment the headlamp may be fixed in position with the aperture in the shell being selectively open and closed by a movable shutter.

BRIEF DESCRIPTION OF THE DRAWINGS

Embodiments of the invention will now be described, by way of example only, with reference to the accompanying drawings, in which:

FIG. 1 is a schematic section showing a first embodiment of headlamp cover system in accordance with the invention, the system being shown in an inoperative condition in which a headlamp is concealed within a spherical shell;

FIG. 2 is a front view of the system shown in FIG. 1, the system being illustrated in an operative condition in which the headlight is aligned with an open aperture of the shell;

DETAILED DESCRIPTION

Figure 3:
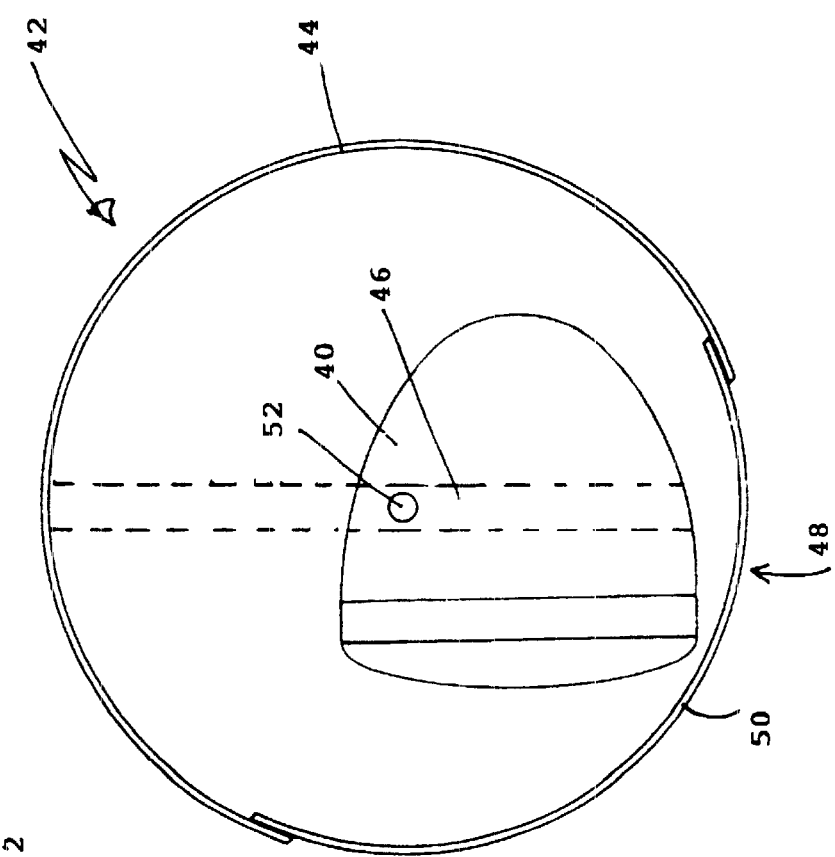
FIG. 3 is a schematic section showing a second embodiment of a cover system in accordance with the invention, the system being shown in an inoperative condition in which an outlet aperture for the headlamp beam is closed by a shutter.

With reference to FIGS. 1 and 2 of the accompanying drawings there is illustrated a motor cycle headlamp cover system comprising a housing 2 of generally spherical form. The housing comprises a generally spherical fixed outer housing part in the form of a hollow shell 4, the shell 4 having a forwardly-facing aperture 6 in its lower part. A headlamp support assembly 8 is mounted within the shell 4 for rotation about a horizontal axis 10 through the centre of the shell 4. The headlamp support assembly 8 comprises a support body 12 having a part-spherical lower surface 12a which lies adjacent to the inner surface of the shell 4. The support body 12 also includes a cradle or recess 14 for receiving a standard sealed headlamp unit 16 and which can readily be replaced when required; suitable retaining means (not shown) serve to releasably secure the headlamp unit 16 within the cradle or recess 14. When the support body 12 is in the position illustrated in FIG. 1, the part-spherical lower surface 12a of the support body 12 lies adjacent the forwardly-facing aperture 6 in the shell 4 and effectively closes that aperture, with the headlamp unit 16 thus being in a position in which it is completely concealed within the shell 4. This constitutes the concealed or inoperative condition of the headlamp unit 16. The headlamp unit 16 is displaceable from the concealed, inoperative, condition to an exposed, operative, condition by rotating the support body 12 anti-clockwise through approximately 90° from the position shown in FIG. 1 so that the lens of the headlamp unit 16 is aligned with the aperture 6 in the shell as shown in FIG. 2. The peripheral shape of the aperture 6 in the shell 4 may correspond to the peripheral shape of the lens when the unit 16 is in its operative condition or alternatively (and as shown) may be larger. The headlamp unit 16 can be returned to its concealed, inoperative, condition by return rotation of the support body 12 in the reverse direction.

Movement of the support body 12 between the inoperative and operative conditions can be effected manually by a control knob projecting to the outside of the shell 4. Alternatively, and as is preferred, the system incorporates a powered drive to displace the support body 12 between its inoperative and operative conditions. In the particular form shown, the powered drive comprises a driving pinion 20 coupled to a low-powered driving motor 22 carried by the support body 12, the driving pinion 20 meshing with a rack 24 formed around part of the inner surface of the shell 4. The driving motor 22 is reversible in order to effect the forward and return movement of the driving pinion 20 along the rack 24. It is however to be understood that other forms of powered drive could be used to effect the movement between the inoperative and operative conditions. In one alternative, the driving pinion is located on or closely adjacent to the rotational support axis 10 of the support body 12 and may project from one lateral side of the body 12 to co-operate with a curved rack of small diameter on the inner surface of the shell 4 immediately adjacent the support axis 10; this arrangement avoids the use of the larger rack as shown in FIG. 1 and may further facilitate overall assembly and construction due to the absence of obstruction which may otherwise be caused by the large rack. If required, two such driving pinions and associated racks may be installed, one at each lateral side of the body 12. In a further alternative, the powered drive may be built wholly into the rotational support system for the body 12 to avoid completely the presence of a rack or similar on the inner surface of the shell 4. In a yet further alternative, movement from one condition to the other, for example inoperative to operative, could be effected by a loaded spring mechanism with manual or remote release with the movement in the opposite direction being effected manually or by a powered mechanism (for example as generally described above) which reloads the spring.

The spherical shell 4 generally resembles the shape of a head with the forwardly-facing aperture 6 in the lower part of the shell 4 corresponding to the position of a mouth within the head, and rotation of the support body 12 between the inoperative and operative conditions corresponding to closing and opening of the mouth. The shell 4 and outwardly-facing surface 12a of the support body 12 may carry appropriate ornamentation, decoration, or embellishment to further enhance the image of a head with a mouth which opens and closes to reveal and conceal the headlamp unit 16. The shell may also carry a pair of fixed, smaller, lights which project forwardly through apertures 30 in the upper part of the shell 4 in positions corresponding to eyes in the head.

The cradle or recess 14 in the support body 12 can be configured to receive different types of currently available headlamp units of appropriate size.

If required, the aperture 6 in the shell 4 may be covered by a transparent panel to seal the interior of the housing 2 against entry of water and dirt.

Figure 4:
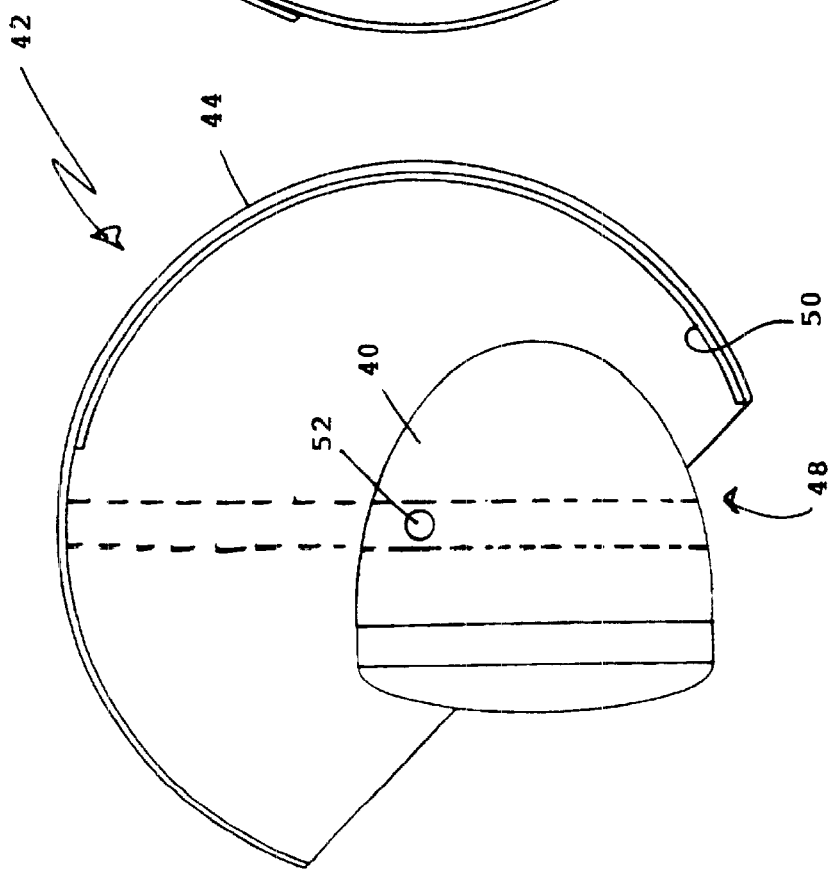
FIG. 4 is a schematic section similar to FIG. 3 but showing the assembly in an operative condition in which the aperture is open.

In the embodiment shown in FIGS. 3 and 4 the headlamp unit remains in a fixed forwardly-facing orientation and may consist of an existing headlamp assembly 40 (headlamp unit and external casing) of a motor cycle to which the cover system 42 is applied. For this purpose, the cover system comprises a fixed shell 44 of generally spherical form attached to the casing of the headlamp assembly 40 by a suitable bracket 46, the fixed shell 44 having in its lower part an aperture 48 through which the beam from the headlamp unit can project. The fixed shell 44 also carries a part-spherical shutter 50 which can swing about a horizontal axis 52 through the centre of the fixed shell 44 between a position in which the shutter 50 closes the aperture 48 (as shown in FIG. 3) and a position in which the aperture 48 is open (as shown in FIG. 4). The pivotal mounting for the shutter 50 can be carried by the bracket 46 (as shown) or alternatively the shutter 50 can be journalled directly to the shell 44. The shutter 50 can be moved between its open and closed positions by a manual control accessible from outside of the shell 44 or by a powered drive incorporated within the shell 44, for example of the type described in connection with the previous embodiment or by a spring-assisted drive also as previously described. Although this embodiment is primarily intended for retro-fitting to an existing headlamp assembly consisting of headlamp unit and casing on a motor cycle, it could alternatively be supplied as a complete assembly comprising cover and headlamp unit for mounting in substitution for an existing headlamp assembly.

If required, the aperture 48 can be covered by a transparent panel to seal the interior against entry of water and dirt.

The cover system of this second embodiment also resembles the general-shape of a head with a mouth which opens and closes, and embellishment and/or decoration can be applied to further enhance the effect. Likewise, further lights may be incorporated within the shell in positions corresponding to the eyes of the head.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

The embodiments have been described by way of example only and modifications are possible within the scope of the invention.

What is claimed is:

1. A motorcycle headlamp assembly comprising a headlamp for emitting a beam and a cover enclosing the headlamp, said cover comprising a shell of generally spherical form that encloses the headlamp and has an inner surface, said shell comprising an aperture through which the beam is emitted when the headlamp is operative, and a shutter for closing the aperture when the headlamp is inoperative, said shutter lying closely adjacent the inner surface of the shell so that an outer surface of the shutter closely conforms to the inner surface of the shell, said shutter being mounted for pivotal movement about an axis substantially coincident with a center of the shell such that said shutter pivots about said axis between a closed position in which the aperture is closed and an open position in which the aperture is opened for transmission of the beam therethrough, said shutter closely conforming to the inner surface of the shell when in its open position.

2. The motorcycle headlamp assembly according to claim 1, wherein the headlamp is mounted to the shutter within the shell for pivotal movement therewith about said axis whereby in the open position of the shutter the headlamp is aligned with the open aperture.

3. The motorcycle headlamp assembly according to claim 1, wherein the headlamp is mounted in a stationary position and the cover is mounted to the headlamp so as to be supported by the headlamp.

4. The motorcycle headlamp assembly according to claim 1, wherein the aperture is covered by a transparent panel to seal the interior of the cover against entry of water and dirt.

5. A motorcycle headlamp assembly comprising a headlamp for emitting a beam and a cover enclosing the headlamp, said cover comprising a shell of generally spherical form enclosing the headlamp, said shell having an inner surface, said shell providing the general appearance of an animal head and having an aperture in a position corresponding to the mouth of the head and through which the beam is emitted when the headlamp is operative, and a shutter for closing the aperture when the headlamp is inoperative, said shutter being of part-spherical form and being mounted within the shell so as to lie closely adjacent the inner surface of the shell so that an outer surface of the shutter closely conforms to the inner surface of the shell, and a pivot assembly mounting the shutter for pivotal movement about a substantially horizontal axis substantially coincident with the center of the shell such that said shutter pivots between a closed position in which the aperture is opened for passage of the beam therethrough, said opening and closing movements of the shutter simulating opening and closure of the mouth of the head.

6. The motorcycle headlamp assembly according to claim 5, wherein said shell includes a pair of further apertures in an upper part thereof in positions corresponding to the respective eyes of the head, the further apertures being associated with a further light source.

7. The motorcycle headlamp according to claim 5, further comprising a pair of lights projecting forwardly from the upper part of the shell in positions corresponding to the respective eyes of the head.

* * * * *